(12) United States Patent
Knuchel

(10) Patent No.: US 9,958,834 B2
(45) Date of Patent: May 1, 2018

(54) WELDED BIMETAL EXTERNAL TIMEPIECE COMPONENT

(71) Applicant: THE SWATCH GROUP RESEARCH AND DEVELOPMENT LTD, Marin (CH)

(72) Inventor: Daniel Knuchel, Biel (CH)

(73) Assignee: The Swatch Group Research and Development Ltd, Marin (CH)

( * ) Notice: Subject to any disclaimer, the term of this patent is extended or adjusted under 35 U.S.C. 154(b) by 308 days.

(21) Appl. No.: 14/434,311

(22) PCT Filed: Sep. 25, 2013

(86) PCT No.: PCT/EP2013/070014
§ 371 (c)(1),
(2) Date: Apr. 8, 2015

(87) PCT Pub. No.: WO2014/072121
PCT Pub. Date: May 15, 2014

(65) Prior Publication Data
US 2015/0261191 A1    Sep. 17, 2015

(30) Foreign Application Priority Data

Nov. 6, 2012  (EP) .................................... 12191479

(51) Int. Cl.
*G04B 37/22*       (2006.01)
*B23K 31/02*       (2006.01)
(Continued)

(52) U.S. Cl.
CPC .............. *G04B 37/22* (2013.01); *B23K 31/02* (2013.01); *B32B 15/01* (2013.01); *G04B 37/00* (2013.01);
(Continued)

(58) Field of Classification Search
CPC ........ G04B 37/22; G04B 37/00; G04B 37/05; G04B 37/221; B23K 31/02; B32B 15/01;
(Continued)

(56) References Cited

U.S. PATENT DOCUMENTS 2,024,150 A * 12/1935 Davignon ............ B23K 20/227
                                                    205/191
2005/0174893 A1* 8/2005 Remont ............... G04B 17/063
                                                    368/127
(Continued)

FOREIGN PATENT DOCUMENTS

CH              30607 A      1/1905
CH            264968 A     11/1949
(Continued)

OTHER PUBLICATIONS

English translation of JP S60-228666A.*
(Continued)

*Primary Examiner* — Jun Yoo
(74) *Attorney, Agent, or Firm* — Oblon, McClelland, Maier & Neustadt, L.L.P.

(57) ABSTRACT

A method of manufacturing an external timepiece component, including: a metallic base made of a first material including titanium and/or a first titanium alloy; at least one metallic cover plate made of a second material, this second material including a second metal selected from among gold and platinum and palladium, and/or a second alloy including at least gold or platinum or palladium, this at least one cover plate being of a thickness greater than or equal to 0.5 millimeters; the at least one cover plate is welded to the base to form a bimetallic blank; and the bimetallic blank is shaped and/or machined to give the structural component its final form.

18 Claims, 3 Drawing Sheets

(51) Int. Cl.
  *B32B 15/01* (2006.01)
  *G04B 37/00* (2006.01)
(52) U.S. Cl.
  CPC .. *Y10T 29/49579* (2015.01); *Y10T 428/12868* (2015.01)
(58) Field of Classification Search
  CPC ...... Y10T 29/49579; Y10T 428/12868; G04G 17/08; G04G 17/00; G04G 17/02; G04D 3/0097
  See application file for complete search history.

(56) References Cited

U.S. PATENT DOCUMENTS

| | | | |
|---|---|---|---|
| 2006/0126438 A1* | 6/2006 | Itou | G04G 17/08 368/47 |
| 2008/0168799 A1* | 7/2008 | Fogel | A44C 9/00 63/15 |

FOREIGN PATENT DOCUMENTS

| | | | |
|---|---|---|---|
| CH | 632377 | A | 10/1982 |
| CH | 652560 | A | 11/1985 |
| FR | 926715 | A | 10/1947 |
| GB | 1406909 | A | 9/1975 |
| JP | S60228666 | A | 11/1985 |

OTHER PUBLICATIONS

English translation of FR 926715.*
International Search Report dated Apr. 3, 2014 in PCT/EP2013/070014 filed Sep. 25, 2013.

* cited by examiner

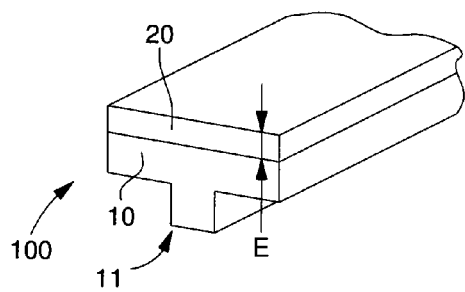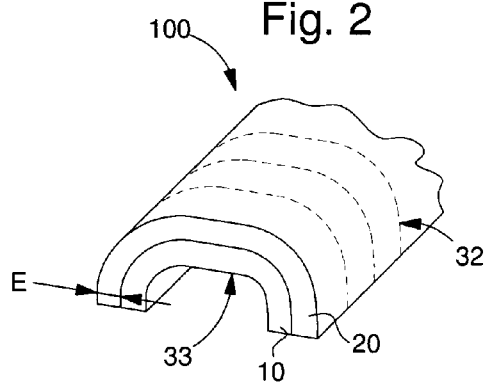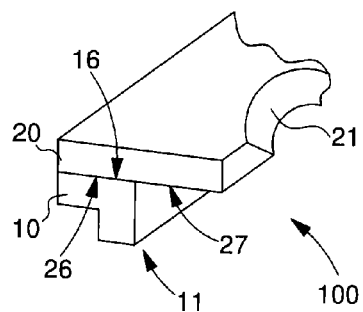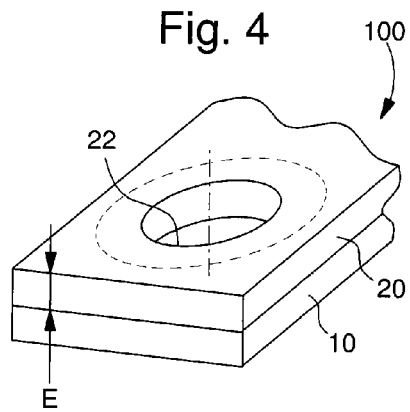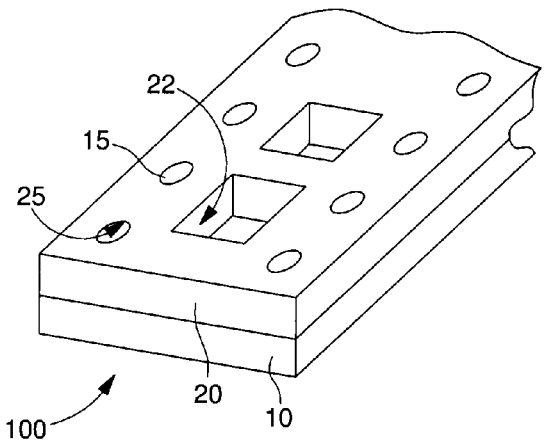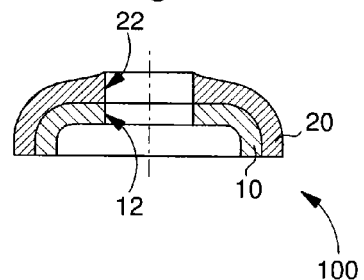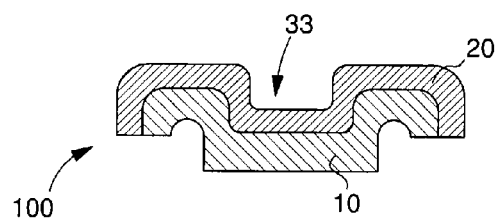

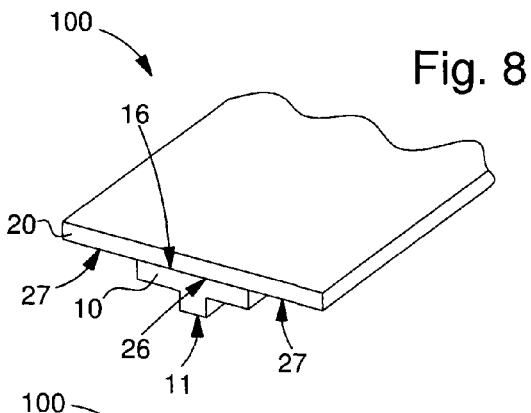
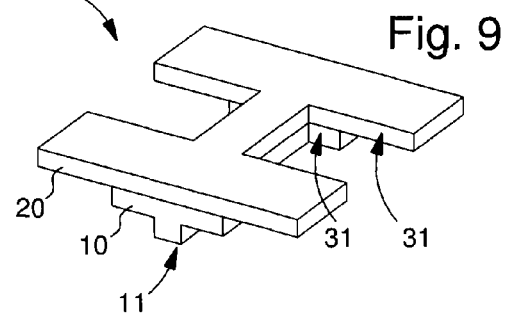
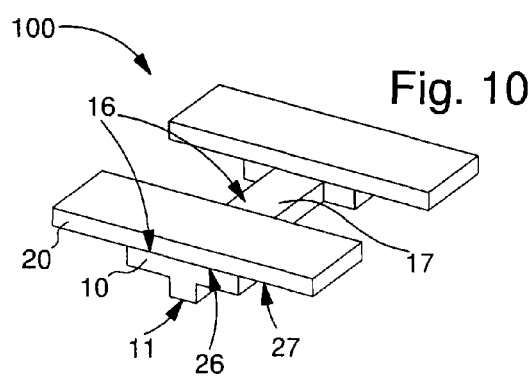
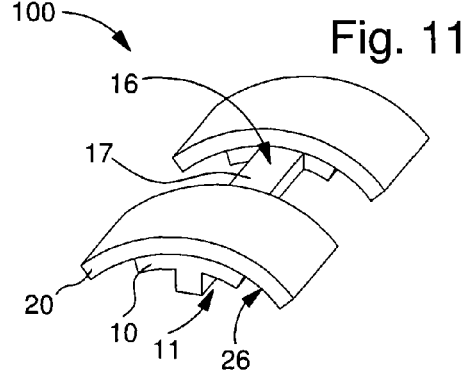
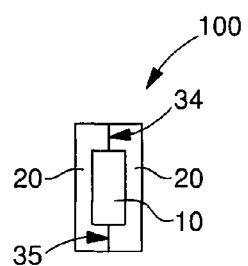
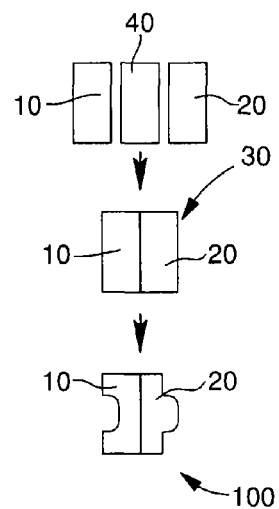

WELDED BIMETAL EXTERNAL TIMEPIECE COMPONENT

CROSS-REFERENCE TO RELATED APPLICATIONS

This is a National Phase Application in the United States of International patent application PCT/EP2013/070014 filed Sep. 25, 2013 which claims priority on European Patent application No. 12191479.0 of Nov. 6, 2012. The entire disclosures of the above patent applications are hereby incorporated by reference.

FIELD OF THE INVENTION

The invention concerns a method of manufacturing an external timepiece component.

The invention also concerns an external timepiece component.

The invention also concerns a timepiece, particularly a watch, including at least one such external component.

The invention concerns the field of horology and jewelry.

BACKGROUND OF THE INVENTION

The manufacture of external timepiece components is often accomplished using noble metals, such as gold or platinum, so as to ensure excellent resistance to corrosion. However, these metals are of high density, and the timepieces thereby made, particularly watches, are very heavy for the user, and are also expensive. A material such as gold is malleable, and it has average mechanical qualities, which often means that it is necessary to select gold alloys, which are more resistant, but also more susceptible to corrosion, with variations in appearance over time.

JP Patent Application No 60228666 A in the name of CITIZEN describes the brazing of components made of gold or gold alloy on a base made of titanium or titanium alloy. This method uses a TiN surface obtained by nitriding to stop the gold penetrating the titanium, and pre-forms a Ni—Pd or Ni—Cu layer.

FR Patent Application No 926715A in the name of PEDERSEN discloses a damascene process with the prior creation of a groove in a first component, which is brought to a temperature higher than the melting temperature of a filler metal forming a decoration, before depositing or colouring the filler metal in the groove in the melted state. Given that the temperature is not necessarily raised above the melting temperatures of the metal of the first component and of the filler metal, this is brazing. The assembly can be shaped by drawing after assembly and brazing.

CH Patent Application No 264968A in the name of BOITES LA CENTRALE discloses the fixing by brazing of a noble metal shell to a base metal support part.

GB Patent Application No 1406909A in the name of SUWA SEIKOSHA discloses the covering, by a spraying technique, with a coating of metallic or non-metallic material, of a basic body which may be made of titanium.

CH Patent Application No 30607A in the name of THIEBAUD discloses a plated watch case, with a non-precious metal part plated with gold leaf on both sides, whose edges are provided with a flat solid gold rim, entirely concealing the base metal. This flat rim is welded to the edge of the plating.

CH Patent Application No 652560A in the name of PRECIMAX discloses a watch bezel in two parts, the lower part made of titanium, the upper of gold, mechanically assembled to each other.

CH Patent Application No 632377A in the name of GRANDJEAN discloses another method similar to damascene, in the specific case of a stainless steel support, in which a hollow is made. The temperature of the support is raised to a temperature close to the "ideal welding temperature" of the stainless steel concerned, and higher than the melting temperature of an ornamental metal, typically gold, which is deposited in the hollow in the form of solid fragments, the ornamental metal then melting and filling the hollow, thereby forming a braze.

SUMMARY OF THE INVENTION

The invention proposes to offer an alternative to the utilisation of external timepiece components made entirely of noble metals.

To this end, the invention concerns a method of manufacturing an external timepiece component, characterized in that:
  there is provided a metallic base made of a first material titanium and/or a first titanium alloy,
  there is provided at least one metallic cover plate made of a second material, said second material including a second metal chosen from among gold and platinum and palladium, and/or a second alloy including at least gold or platinum or palladium, said at least one cover plate being of a thickness greater than or equal to 0.5 millimeters;
  said at least one cover plate is welded to said base so as to form a bimetallic blank, by bringing said cover plate and said base to a temperature higher than the melting temperature of said cover plate and than the melting temperature of said base;
  said bimetallic blank is shaped and/or machined to give said structural component its final form.

The invention also concerns an external timepiece component, characterized in that said component is made of bimetallic material including a metallic base made of a first material including titanium and/or a first titanium alloy, and at least one metallic cover plate made of a second material including a second metal selected from among gold and platinum and palladium and/or a second alloy including at least gold or platinum or palladium, said cover plate being directly in contact with said base on at least one welded area whose microstructure is different from the microstructure of said cover plate and from the microstructure of said base.

According to a feature of the invention, said base and said cover plate are welded to each other, and said cover plate is of a thickness greater than or equal to 0.5 millimeters.

The invention also concerns a timepiece, particularly a watch, including at least one such external component.

BRIEF DESCRIPTION OF THE DRAWINGS

Other features and advantages of the invention will appear upon reading the following detailed description, with reference to the annexed drawings, in which:

FIG. 1 shows a schematic, perspective view of an external component according to the invention, with a cover plate welded to a profiled base.

FIG. 2 shows a schematic, perspective view of an external component according to the invention, with a cover plate welded to a base and drawn therewith after welding.

FIG. 3 shows a schematic, perspective view of an external component according to the invention, with a cover plate which includes a cutout and is welded to a profiled base on only one portion of the lower surface of the cover plate facing said base.

FIG. 4 shows a schematic, perspective view of a bimetallic blank according to the invention, with a cover plate which includes a through aperture and is welded to a base, and FIG. 5 shows a cross-section of an external component obtained by finishing the bimetallic blank of FIG. 4, with the external profile formed by drawing and/or machining, and an aperture, machined after welding, so as to form, for example, a watch bezel.

FIG. 6 shows a schematic, perspective view of an external component according to the invention, with a cover plate including positioning bores and through apertures, welded to a base including positioning pins corresponding to the bores in the plate.

FIG. 7 shows a schematic, transverse cross-sectional view of an external component similar to that of FIG. 2, with a deep drawn section made after welding.

FIG. 8 shows a schematic, perspective view of an external component according to the invention, with a cover plate welded to a profiled base on only one portion of the lower surface of the cover plate facing said base.

FIG. 9 shows a schematic, perspective view of an external component according to the invention, similar to that of FIG. 8 and including H-shaped machined cutouts formed in the assembly after welding.

FIG. 10 shows a schematic, perspective view of an external component according to the invention, with two cover plates welded to the same profiled base on only one portion of the lower surface of the cover plate facing said base.

FIG. 11 shows a schematic, perspective view of an external component according to the invention, similar to FIG. 10, and wherein four lateral wings are formed by drawing after welding.

FIG. 12 shows a schematic, transverse cross-sectional view of an external component according to the invention, including two cover plates made of a gold or platinum or palladium alloy and welded to both sides of a titanium or titanium alloy base.

FIG. 13 shows a block diagram of the method of manufacturing a component according to the invention.

FIG. 14 shows a perspective view of the preparation of a titanium base, with cutouts and through apertures; FIG. 15 shows the pre-folding of the base to transform into yokes the cross-pieces formed by cutting in the first operation, FIG. 16 shows the bimetallic blank after welding gold cover plates to some surfaces of the base, FIG. 17 shows a schematic, end view of a section obtained by sawing the blank, which is then shaped by deformation to form the external component shown in FIG. 18, in this case a claw, shown in position on a watch case in cross-section in FIG. 19, and in a plan view in FIG. 20.

DETAILED DESCRIPTION OF PREFERRED EMBODIMENTS

Figure 14:
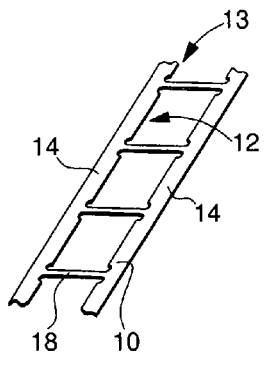
FIGS. 14 to 20 illustrate the manufacture of watch claws.

The invention proposes to offer an alternative to the utilisation of external timepiece components made entirely of noble metals, particularly of gold or platinum or palladium alloys, which are therefore very heavy for the user, and expensive.

In particular, in the case of watch components, which are the preferred application of the invention, although the invention is directly applicable to jewelry components, the external components must exhibit excellent resistance to corrosion, yet still have good mechanical qualities.

The invention proposes to combine, within the same external component, the advantages of high mechanical resistance of a first constituent, hereafter termed the "base", made of a material selected both for its mechanical resistance and its resistance to corrosion, and the advantages of appearance and high resistance to corrosion of at least a second constituent, hereafter termed the "cover plate". The invention concerns solid components, wherein the thickness E of each constituent is preferably greater than 0.5 millimeters.

Indeed, as will be seen later in the description, the invention incorporates a welding operation. This operation is easier to control if the parts to be welded to each other are thick and of comparable thickness. Naturally, the invention may also be implemented with constituents of smaller thickness, for example greater than 0.2 millimeters.

The invention concerns a method of manufacturing an external timepiece component 100. According to this method:

there is provided a metallic base 10 made of a first material including titanium and/or a first titanium alloy, there is provided at least one metallic cover plate 20 made of a second material, said second material including a second metal selected from among gold and platinum and palladium and/or a second alloy including at least gold or platinum or palladium, said at least one cover plate 20 being of a thickness E greater than or equal to 0.5 millimeters;

said at least one cover plate 20 is welded to said base 10 so as to form a bimetallic blank 30, by bringing cover plate 20 and base 10 to a temperature higher than the melting temperature of cover plate 20 and than the melting temperature of base 10;

said bimetallic blank 30 is shaped and/or machined to give said structural component 100 its final form.

In a particular implementation, there is provided a base 10 which is flat prior to the welding operation, and there is provided a cover plate 20 which is flat prior to the welding operation, and the welding operation between base 10 and cover plate 20 is performed in a flat position.

Preferably, the first alloy and the second alloy are selected with no nickel content.

As regards base 10, grade 2 titanium, or grade 5 titanium or T35 titanium is advantageously chosen as the first material of base 10. Grade 2 titanium is particularly suited for a high quality weld with an 18 carat gold alloy. Titanium and its alloys form a family having similar mechanical qualities to those of steels, with a much smaller mass than that of steels, in addition to very high resistance to corrosion, particularly to saline mist.

Preferably, an 18 carat gold alloy or a platinum alloy with at least 95% platinum or a palladium alloy with at least 75% palladium is selected for the second material.

When a gold alloy is used, an 18 carat 5N gold alloy is advantageously selected for this second material.

The specific selection of gold-titanium is especially efficient for limiting corrosion.

In a variant, the second material is palladium or a palladium alloy. The use of palladium, like gold or platinum, is suitable for the durable attachment of cover plate 20 to base 1, so as to form a bimetallic blank 30 by crimping and/or brazing and/or welding.

In some variant embodiments, as seen, for example, in FIG. 2, this bimetallic blank 30 is shaped by deformation by stamping and/or drawing.

In other variants, as illustrated in FIG. 10 or 11, the bimetallic blank 30 is machined to remove cover plate 20 locally, so as to reveal locally at least one surface 16 of base 10.

In an advantageous embodiment for securing component 100 to a watch or the like, base 10 is advantageously chosen in the form of a profile bar 11.

In some applications, as seen in FIG. 3 or 4, cover plate 20 is chosen to be pre-machined with at least one cutout 21 and/or through aperture 22.

For optimum relative positioning, before being welded to each other, base 10 and cover plate 20 are advantageously prepared with raised and/or hollowed reference points 15, 25, as seen in FIG. 6, for the geometric matching of said base and plate prior to the welding operation and for holding them to each other during the welding operation.

In a variant, as seen in FIG. 1, 2, 4, 6 or 10, cover plate 20 is welded to base 10 over their entire common contact surface.

Figure 23:
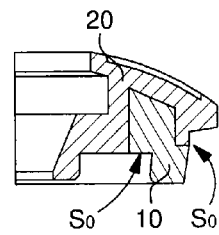
FIG. 23 shows, in cross-section, a cover plate already crimped to a base, and displays welding areas just below the surface at the joining surfaces.

In a variant embodiment illustrated in FIG. 23, the weld is performed just below joining surface S0 between cover plate 20 and base 10

In a variant embodiment, the welding is laser welding.

In a variant embodiment, the welding is ultrasonic welding.

In an advantageous variant embodiment, prior to welding cover plate 20 to base 10, there is performed on at least cover plate 20 or base 10 a mechanical deformation action for the crimping thereof respectively to base 10 or cover plate 20.

Preferably, this mechanical deformation action is performed on cover plate 20.

Figure 21:
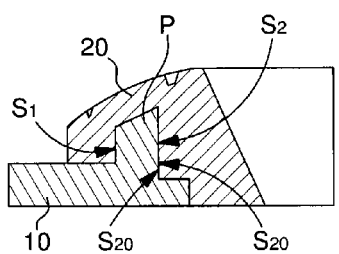
FIGS. 21 and 22 show, in cross-section, the assembly of a cover plate and a base, before and after crimping at a tenon profile of the base cooperating with a mortise profile of the cover plate.
Figure 22:
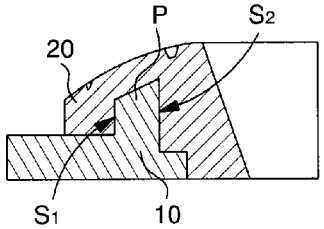

In an advantageous variant embodiment, as seen in FIGS. 21 and 22, a tenon profile P is made in the base, intended to cooperate with a mortise profile in the cover plate, or vice versa. The tenon P of the base includes two opposite lateral surfaces S1 and S2, the associated cover plate 20 includes two parallel mortise surfaces S20. During crimping, surfaces S20 are pressed against surfaces S1 and S2 to clamp the protruding portion P and thereby form therewith an inseparable assembly.

Gold-titanium crimping provides good support for the gold on the titanium, and a precise geometry, which is finished by welding, made easier by this good prior support.

The example of FIGS. 4 and 5 shows, in a simplified manner, the making of a watch bezel, with prior preparation of a bimetallic blank 30 from a cover plate 20 including a through aperture 22 and welded to a base 10. This blank 30 is then shaped by deformation and/or machining, with the external profile formed by drawing and/or machining, and an aperture 12 machined, after welding, in base 10 in the extension of aperture 22, or by reproducing aperture 22 both in base 10 and in cover plate 20.

In other variants, cover plate 20 is welded to base 10 on only one portion of the surface 26 of cover plate 20 facing said base 10, and/or on only one portion of surface 16 of base 10 facing said cover plate 20.

Naturally, it is understood that the notion of "bimetallic" is not restrictive, since base 10 can itself be made according to the invention, and include several layers welded in pairs: the invention also applies to a sandwich type external component 100, including two cover plates 20 made of a gold or platinum or palladium alloy band welded to both sides of a base 10 made of titanium or a titanium alloy. This configuration may be required by constraints of external appearance. The titanium core guarantees rigidity and perfect positioning relative to the other parts of the timepiece. As seen in FIG. 12, cover plates 20 may be contiguous with each other on a joining surface 34, or on a junction plane if they are flat, and be welded or soldered gold-on-gold on the seam 35. The invention may, therefore, extend to the manufacture of voluminous components, made by welding pairs of opposing surfaces, one made of titanium or titanium alloy, and the other of gold or platinum or palladium or a gold alloy or a platinum alloy or a palladium alloy.

The invention also concerns an external timepiece component 100 made of bimetallic material including a metallic base 10 made of a first material including titanium and/or a first titanium alloy, and at least one metallic cover plate 20 made of a second material including a second metal chosen from among gold and platinum and palladium and/or a second alloy including at least gold or platinum or palladium, cover plate 20 being directly in contact with base 10 on at least one welded area whose microstructure is different from the microstructure of cover plate 20 and from the microstructure of base 10. Preferably, base 10 and cover plate 20 are welded to one another and this at least one cover plate 20 has a thickness E greater than or equal to 0.5 millimeters.

The invention also concerns a timepiece, particularly a watch 1000, including at least one such external component 100.

Figure 15:
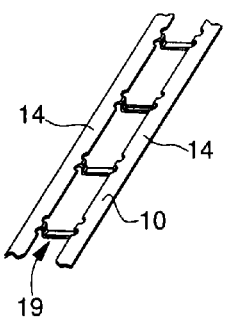
Figure 16:
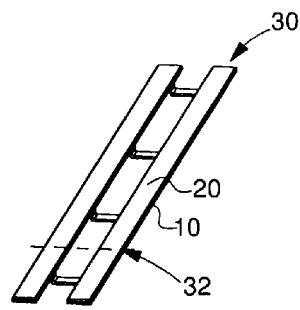
Figure 17:
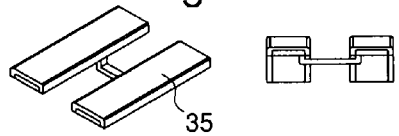
Figure 18:
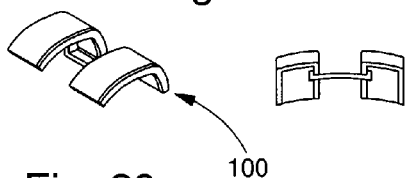
Figure 19:
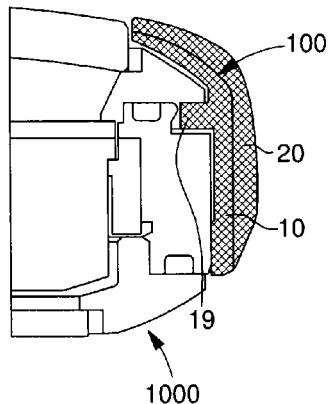
Figure 20:
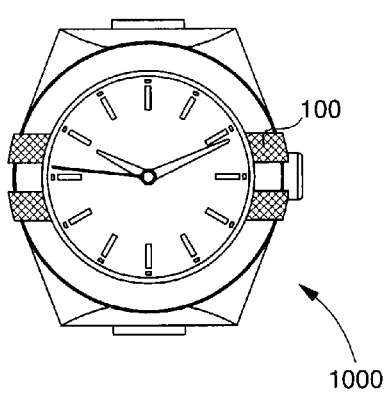

FIGS. 14 to 20 illustrate a non-limiting example of the manufacture of claws 100 for a watch 1000.

as seen in FIG. 14, a titanium base 10 is cut from a sheet or board, with cutouts 13 and through apertures 12, so as to form a ladder-like structure with lateral support surfaces 14 connected by cross-pieces 18;

as seen in FIG. 15, these cross-pieces 18 are bent to form yokes 19, the base then being ready to receive cover plates 20;

two gold cover plates 20 are welded to the lateral support surfaces 14 of base 10, as seen in FIG. 16, thereby forming bimetallic blank 30;

FIG. 17 shows a section 35 obtained by sawing or cutting along a saw line 32 of blank 30;

this section 35 is then shaped by deformation to form the external component 100 shown in FIG. 18, in this case a claw, mounted in position in a watch case in FIGS. 19 and 20.

The invention claimed is:

1. A method of manufacturing an external timepiece component, comprising:

providing a metallic base made of a first material which is titanium and/or a first titanium alloy;

providing at least one metallic cover plate made of a second material, the second material including a second metal chosen from among gold and platinum and palladium, and/or a second alloy including at least gold or platinum or palladium, the at least one cover plate being of a thickness greater than or equal to 0.5 millimetres;

welding the at least one cover plate, without filler material, to the base to form a bimetallic blank, by bringing the cover plate and the base to a temperature higher than the melting temperature of the cover plate and than the melting temperature of the base; and shaping the bimetallic blank and/or machining to give the component a final form thereof, wherein the method is applied to making an external component which is a watch case claw, and wherein:
a base made of titanium or titanium alloy is cut from a sheet or board, with cutouts and through apertures, to form a ladder-like structure with lateral support surfaces connected by cross-pieces;
the cross-pieces are folded to form yokes;
two gold cover plates are welded to the lateral support surfaces of the base, to form a bimetallic blank;
a section of the bimetallic blank is cut; and
the section is shaped by deformation to form the claw.

2. The method according to claim 1, wherein a titanium alloy which is grade 2 titanium, or grade 5 titanium or T35 titanium is selected as the first material.

3. The method according to claim 1, wherein the base is flat prior to the welding, and the cover plate is flat prior to the welding, and the welding between the base and the cover plate is performed in a flat position.

4. The method according to claim 1, wherein the first titanium alloy and the second alloy are selected with no nickel content.

5. The method according to claim 1, wherein an 18 carat gold alloy or a platinum alloy with at least 95% platinum or a palladium alloy with at least 75% palladium is selected as the second material.

6. The method according to claim 5, wherein an 18 carat 5N gold alloy is selected as the second material.

7. The method according to claim 1, wherein the bimetallic blank is shaped by deformation by stamping and/or by drawing.

8. The method according to claim 1, wherein the bimetallic blank is machined to locally remove the cover plate.

9. The method according to claim 1, wherein the base is selected in a form of a profile bar.

10. The method according to claim 1, wherein the cover plate is pre-machined with at least one cutout and/or through aperture.

11. The method according to claim 1, wherein, prior to being welded to one another, the base and the cover plate are prepared with raised and/or hollow points of reference for geometric matching of the base and the plate before the welding and for holding the base and the plate to each other during the welding.

12. The method according to claim 1, wherein the cover plate is welded to the base over an entire common contact surface thereof.

13. The method according to claim 1, wherein the cover plate is welded to the base on only one portion of the surface of the cover plate facing the base, and/or on only one portion of the surface of the base facing the cover plate.

14. The method according to claim 13, wherein the welding is performed just below a joining surface between the cover plate and the base.

15. The method according to claim 1, wherein the welding is laser welding.

16. The method according to claim 1, wherein the welding is ultrasonic welding.

17. The method according to claim 1, wherein, prior to welding the cover plate to the base, there is performed on at least the cover plate or the base a mechanical deformation action for crimping thereof respectively to the base or to the cover plate.

18. The method according to claim 17, wherein the mechanical deformation action is performed on the cover plate.

* * * * *